March 22, 1949.                E. G. ERSON                2,464,968
                           PROTECTION VALVE DEVICE
                             Filed July 10, 1946
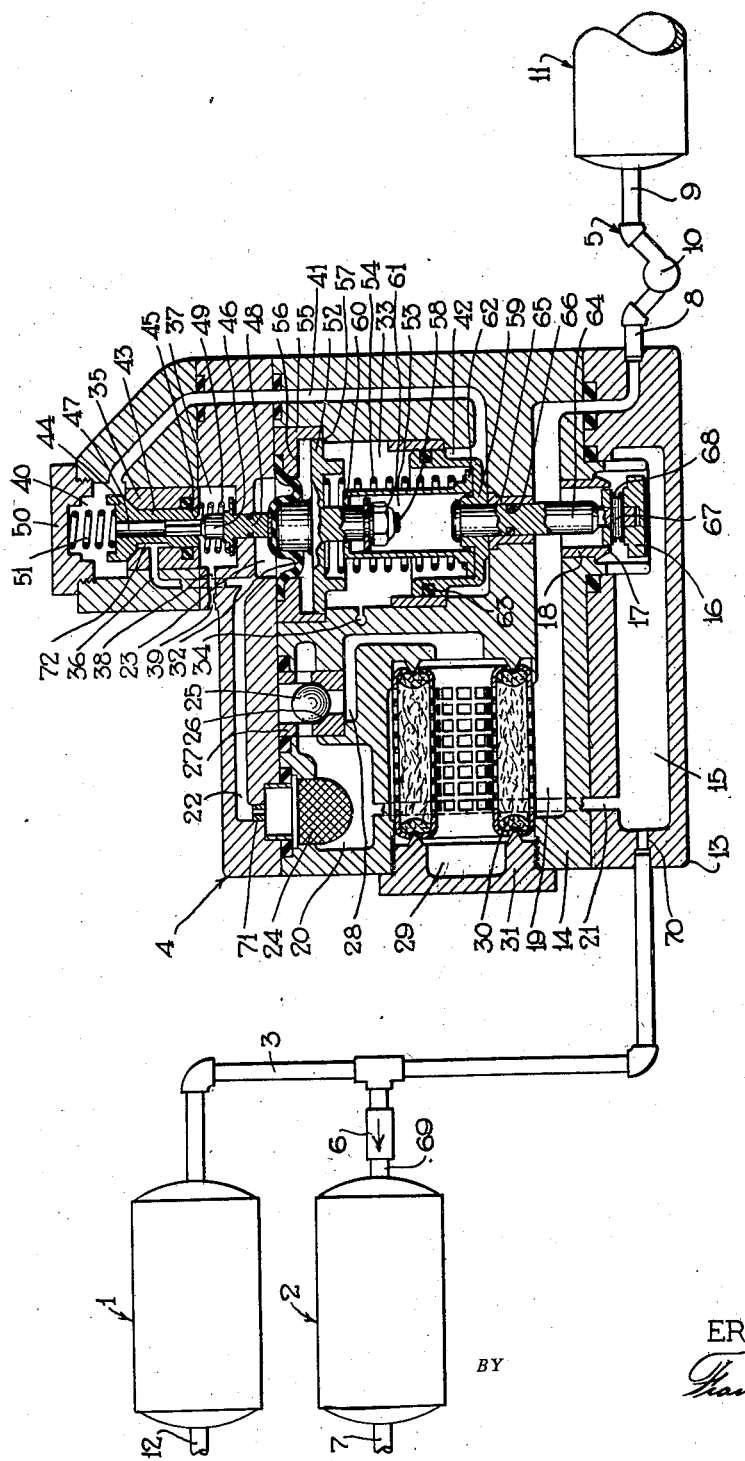
INVENTOR
ERIK G. ERSON
BY
Frank E. Miller
ATTORNEY Patented Mar. 22, 1949

2,464,968

UNITED STATES PATENT OFFICE 2,464,968

PROTECTION VALVE DEVICE

Erik G. Erson, Wilkinsburg, Pa., assignor to The Westinghouse Air Brake Company, Wilmerding, Pa., a corporation of Pennsylvania Application July 10, 1946, Serial No. 682,680

5 Claims. (Cl. 303—84)

This invention relates to fluid pressure brakes, and more particularly to an air brake equipment of the type employed on a railway locomotive.

Diesel-powered locomotives for certain classes of railway service in some instances comprise a plurality of individual power units coupled together. For example, a complete Diesel locomotive may consist of one "A" (control) unit coupled to first and second "B" (auxiliary) units, all three power units carrying engine equipments controlled from the "A" unit. Diesel locomotives of this class are operative to exert great tractive effort, particularly at low speeds. Although such Diesel locomotives are regularly operated to great advantage and without undue risk of separation of the several units, actual experience has demonstrated that such an accident is possible, and that the leading portion of a Diesel locomotive might break away from the other units and the rest of the train. The engineer stationed in the leading portion may in fact be unaware that a break-in-two has occurred, by reason of the enormous power which that unit delivers, and as a result, the parting of the main reservoir pipe between the separated units of the locomotive may seriously impair his control of the brake equipment. The locomotive brake equipment on a multiple unit Diesel locomotive is, of course, designed to operate automatically upon parting of the brake pipe to effect an emergency application of the brakes, but if the engineer is unaware of a break-in-two and consequently allows his brake valve to remain in running position, and if, as is usually the case, the controlled emergency feature of the equipment has been set for freight service to permit only a slow rate of brake cylinder pressure development, the loss of main reservoir pressure through the broken main reservoir pipe will in a short time seriously limit the brake cylinder pressure obtainable in the leading portion of the locomotive.

It is an object of my invention to provide an improved locomotive brake equipment designed for Diesel units of the above identified class, including means operative to prevent brake failures of this nature.

Another object of the invention is to provide an improved protection valve device operative to prevent complete loss of main reservoir pressure in the leading locomotive in case of a train break-in-two.

A further object is to provide improved means operative to permit the flow of fluid under pressure from a main reservoir on the first locomotive unit through the main reservoir pipe to the reservoir on the trailing locomotive unit only after the fluid under pressure in the reservoir of the first locomotive unit attains a selected degree of pressure and operative thereafter when the fluid pressure in the main reservoir pipe is reduced to a chosen lower degree to prevent the flow of fluid under pressure from the reservoirs on the first unit to the main reservoir pipe, which means may be readily installed in an existing brake equipment for cooperation with standard brake controlling devices without impairing the normal functioning of the apparatus.

This invention will be described as embodied with a locomotive freight equipment, and constitutes an improvement in that part of the equipment which form the subject matter of patent application by Glenn T. McClure, Serial No. 582,934, filed March 15, 1945 and assigned to the assignee of the present invention, which issued September 17, 1946 as Patent No. 2,407,890.

Other objects and advantages will be apparent in the following more detailed description of the invention.

The single figure in the accompanying drawing is a diagrammatic view, partly in section, of a protection valve device constructed in accordance with the invention and associated with such portions of the air brake equipment of a multiple unit Diesel locomotive as concern the invention.

In the drawing, the reference numerals 1 and 2 indicate a pair of main reservoirs which are carried on the leading locomotive unit and comprise a part of the usual air brake equipment (not shown) thereon. The main reservoirs 1 and 2 are connected by means of a pipe 3 to a protection valve device 4, which device operates to control communication between the pipe 3 and a main reservoir pipe 5, as will hereinafter more fully appear. A check valve device 6 is provided to prevent back flow of fluid under pressure from the main reservoir 2 to the pipe 3, the main reservoir 2 being provided for the purpose of storing fluid under pressure to be supplied to a pipe 7 leading to the usual air brake equipment (not shown) installed on the leading unit of a Diesel locomotive. The main reservoir pipe 5 comprises a section 8, carried on the leading locomotive unit. and a section 9 carried on the trailing locomotive unit, sections 8 and 9 being connected by a coupling means 10. The section 9 is connected to a main reservoir 11 which comprises a part of the usual air brake equipment (not shown) for the trailing locomotive unit. It will be understood that the main reservoirs 1 and 2 are adapted to be charged with fluid under pressure delivered by way of a pipe 12 leading from a compressor (not shown) mounted on the leading locomotive unit, and the main reservoir 11 is adapted to be charged with fluid under pressure from a suitable compressor (not shown) mounted on the trailing locomotive unit.

The protection valve device 4 may comprise a base structure 13 supporting a casing structure 14 and containing a supply chamber 15, which chamber is in constant open communication with the main reservoir 1 by way of the pipe 3. Contained in the supply chamber 15 is a supply control valve 16, which valve cooperates with a valve seat 17, formed on the end of a bushing 18, to control communication by way of said bushing between the supply chamber 15 and a passage 19, which passage connects with the main reservoir pipe 8.

Formed in the casing structure 14 is a strainer and check valve chamber 20, which chamber is in constant open communication with the supply chamber 15 by way of a passage 21 and with a diaphragm chamber 23 by way of a passage 22. For the protection of the passage 22 against the passing of dirt therethrough there is provided in chamber 20 a wire screen strainer 24 which is clamped between two sections of the casing structure 14. Also contained in the chamber 20 is a ball check valve 25 arranged for operative engagement with a valve seat 26 formed in a suitable bushing 27 mounted in the casing structure 14, the under side of the check valve 25 being in communication with the passage 19 by way of a passage 28 and a chamber 29. For the protection of the valve device 4 and the other air brake equipment when fluid under pressure from the main reservoir pipe 5 flows past the check valve 25, as will hereinafter more fully appear, a tubular air cleaner or strainer 30 of the cartridge type is mounted in the chamber 29 so as to have its inner periphery open to the passage 28 and outer periphery exposed to the passage 19. Upon removal of a cap nut 31 which closes the outer end of the chamber 29 and has sealing engagement with one end of the strainer 30, the strainer may be readily removed for cleaning.

Clamped at its periphery between two sections of the casing structure 14 is a flexible diaphragm 32 having at its lower side a spring chamber 33 which is constantly open to atmosphere by way of a passage 34, while at the upper side of the diaphragm 32 there is the chamber 23 which is always connected with passage 22 as previously noted and is also connected to the interior of a bushing 35 by way of the passage 22 and a passage 36. At the lower end of the bushing 35 is a spring chamber 37 which is in constant open communication with the atmosphere by way of a passage 38 and a choke 39, and at the upper end of the bushing is another spring chamber 40 which is open to a passage 41 leading to a piston chamber 42. For controlling communication between the spring chambers 37 and 40 and between the passage 36 and the chamber 40, a valve member 43 is slidably mounted in the bushing 35. The upper end of the valve member 43 is provided with a conical valve 44 for sealing engagement with the upper end of the bushing 35, and the lower end of the valve member is provided with an annular valve seat 45 for cooperation with an exhaust valve 46 contained in the spring chamber 37 and slidably guided by means of a fluted stem in a through axial bore 47 in said valve member. Engaging the diaphragm 23 and extending through a suitably sealed bore from the chamber 37 to the chamber 23 is a stem 48 for effecting an operative connection between the diaphragm and the valve member 43. Interposed between and operatively engaging the stem 48 and the bottom of the bushing 35 is a spring 49 which tends at all times to keep the stem in abutting engagement with the diaphragm 32. Interposed between a cap nut 50 closing the top of the chamber 37 and the valve member 43 is a spring 51 which tends at all times to move the valve member downwardly toward the position in which it is shown.

Contained in the chamber 33 and interposed between a diaphragm follower member 52 and a spring seat member 53 is a compression spring 54, which, as will hereinafter more fully appear, serves to establish the degrees of fluid pressure in the supply chamber 15 at which the valve 16 will be open or closed. The follower 52 is slidably guided in an annular member 55, the member 55 also serving as a medium for clamping the diaphragm 32 and being arranged in the chamber 33 so as to confine the travel of the follower 52 between a surface 56 of the member 55 and a shoulder 57 provided in the peripheral wall of the chamber 33 as shown in the drawing.

The spring seat member 53 slidably engages a stud portion 58 of the follower member 52 for the purpose of retaining the spring 54 in operative engagement with the follower member 52 and also for limiting, in a manner to be explained later, the upward travel of a piston member 59 mounted in the chamber 42. The member 53 is substantially tubular in shape, having its upper end 60 turned inwardly for engagement with a washer 61 secured to the stud portion 58, and having its lower end 62 flared outwardly for supporting and retaining the spring 54 at its lower end and thereby caging the spring.

The piston member 59 is substantially cup-shaped for accommodating the lower ends of the spring 54 and the seat member 53 and abuts the bottom surface of the seat member for propelling the same upwardly until the upper end 60 thereof engages the follower member 52. A sealing ring 63 is provided in an annular groove in the periphery of piston member 59 for preventing leakage of fluid under pressure from the chamber 42 to the atmospheric chamber 33. The piston member 59 is further provided with a downwardly extending stem 64 which is slidably mounted in a through bushing 65 in a wall in the casing structure 14 and extends transversely through the passage 19 and bushing 18 into the supply passage 15. The stem 64 is also provided with a sealing ring 66 for preventing leakage of fluid under pressure between the passage 19 and the chamber 42. Secured by means of a pin 67 and a retaining spring or clip 68 to the lower end of the stem 64 of the piston member 59 is the valve 16, which, as will later appear, may be operated thereby into engagement with the valve seat 17. It is preferred that the clearances in the mounting means of the valve 16 be sufficient to permit the valve to be self-aligning in its operation.

In charging the locomotive fluid pressure system with fluid under pressure, under normal conditions, fluid under pressure is supplied from the usual compressor (not shown) on the leading locomotive to the main reservoir 1 by way of the pipe 12 and flows therefrom by way of the pipe 3, check valve device 6, and a pipe 69 to the main reservoir 2, from which fluid under pressure is supplied by way of pipe 7 to the usual air brake control equipment on the leading unit of a Diesel locomotive. Fluid under pressure also flows from pipe 3 through a passage 70 to the supply chamber 15 of the protection valve device 4. At the same time fluid under pressure is also supplied to the main reservoir 11 on the trailing unit by the operation of auxiliary compressor means (not shown) mounted on that unit.

Fluid under pressure supplied to the chamber 15 of the protection valve device 4 flows from that chamber by way of the passage 21 to the chamber 20, thence by way of a choke 71 inserted in the passage 22 for reasons which will appear later, and from the passage 22 to the diaphragm chamber 23, whence it will flow by way of the passage 36, a cavity 72 in the valve member 43, past the valve 44, which is unseated at this time, to the chamber 40, and then to the piston chamber 42 by way of the passage 41. With the valve 46 seated, communication of the piston chamber 42 to atmosphere is cut off. The valve 16 being unseated as shown, fluid under pressure in chamber 15 may also flow to the main reservoir 11 by way of the bushing 18, chamber 19 and main reservoir pipe 5, if the fluid pressure in the main reservoir 11 is lower, such as when the compressor (not shown) on the trailing unit is not operating.

Since the degree of fluid pressure in the chambers 23 and 42 is substantially the same and the effective area of the piston member 59 is greater than that of the diaphragm 32, the piston member 59 will respond to a lower degree of fluid pressure than will the diaphragm 32. When the pressure of fluid in the chamber 42, has reached a chosen degree (22 pounds for example) as determined by the value of the spring 54, the piston member 59 will move the spring seat member 53 upwardly against the opposing pressure of the spring 54 until the valve 16 engages the valve seat 17. With this movement the piston member 59 acts through the medium of its stem 64 and the pin 67 to move the valve 16 into sealing engagement with the valve seat 17, closing communication between the chambers 15 and 19 and thus between main reservoirs 1 and 11.

However, fluid under pressure will continue to flow from chamber 15 to chambers 23 and 42 by way of the route previously described. When the pressure of fluid in the diaphragm chamber 23 has attained a higher chosen degree, such as 100 pounds, the diaphragm 32 will deflect downwardly in response thereto, causing the follower 52 to move downwardly until stopped by engagement of the lower outer surface thereof with the shoulder 57 in the chamber 33. It will be noted that the spring 54 had previously been compressed a certain amount due to the upward movement of the piston member 59, consequently the force of the spring acting to oppose the downward deflection of the diaphragm was correspondingly increased.

Upon deflection of the diaphragm member 32 toward its lower position, the spring 51 will act to move the valve 44 of the valve member 43 downwardly into sealing engagement with the upper end of the bushing 35, thereby closing communication between the chambers 23 and 42. Further deflection of the diaphragm 32 toward its lower position will cause the spring 49 to actuate the valve 46 downwardly out of sealing engagement with the valve seat 45 of the valve member 43 to the position in which it is shown, thus connecting chamber 42 to atmosphere. Fluid under pressure in chamber 42 will flow by way of the passage 41 to chamber 40, thence through bore 47 of the valve member 43 and past valve 46 to chamber 37, whence it will flow to atmosphere by way of the passage 38 and choke 39. When the pressure of fluid in the chamber 42 acting on the lower side of the piston member 59 decreases below the pressure of the spring 54 acting on the upper side of the piston member, the spring will act to move the piston member downwardly to the position in which it is shown in the drawing. The downward movement of the piston member will cause the valve 16 to assume the position in which it is shown, this being the normal position for valve 16 on a leading unit with the brake equipment thereof fully charged. Communication is again established between the main reservoir 1 on the leading unit and the main reservoir 11 on the trailing unit by way of pipe 3, passage 70, chamber 15, bushing 18, passage 19 and the main reservoir pipe 5.

The positions in which the valve member 43 and the valve 46 are shown in the drawing are the normal positions for these valves on a leading unit with the brake equipment thereof fully charged. It should be noted that under these normal or prevailing conditions the communication to atmosphere by way of the passage 38 and the choke 39 is cut off and that in no case, even when charging, can the main reservoir pipe 5 be connected to said passage and choke. Consequently there will be no sustained flow of fluid under pressure from the main reservoir pipe 5 to atmosphere. The only time there will be any flow to atmosphere will be that time subsequent to the operation to render the piston member 62 and the valve 16 effective, and then only in a small measured amount.

It will be understood that the volume of the chamber 40, passage 41 and chamber 42 is relatively small and that consequently the choke 39, although of small flow capacity, will permit the fluid pressure therein to be rapidly depleted. It will be apparent therefor that substantially the full force of the spring 54 will be effective at once to open the valve 16 promptly. It should be further explained that any temporary fluid pressure drop in the chamber 15 which might be caused by the sudden opening of the valve 16, especially with the high pressure differential across it, will not, due to the flow restricting choke 71, result in a corresponding reduction in the pressure of fluid in the diaphragm chamber 23, thus insuring against an undesirable operation of the diaphragm 32 and the piston member 59 to again close the valve 16. Thus the choke 71 serves to stabilize the diaphragm so that communication from the main reservoir 1 to the piston chamber 42 is maintained closed and the communication from main reservoir 1 to the main reservoir 11 is maintained open against accidental movement.

If, however, the main reservoir line 5 is broken or opened to the atmosphere as by the accidental separation of the locomotive units, fluid under pressure in the main reservoir 1 will flow to atmosphere by way of pipe 3, protection valve device 4, and the undesired rupture of the main reservoir pipe 5. The resulting reduction in the fluid pressure in chamber 15 of the valve device 4 will cause fluid under pressure to flow from the diaphragm chamber 23 by way of the passage 22, choke 71, chamber 20 and passage 21 to chamber 15 and thence to atmosphere by way of bushing 18, passage 19 and main reservoir pipe 5. When pressure of fluid in chamber 23 has been reduced to some chosen low degree such as 80 pounds, the predominant pressure of the spring 54 will cause the diaphragm 32 to deflect upwardly and act through the medium of the stem 48 to move the valve 46 against the lesser opposing pressure of the spring 49 to its seated position, thereby closing communication of chamber 42 to atmosphere, and then to actuate the valve 44 against the higher opposing pressure of the spring 51 to its unseated position, thereby connecting chamber 23 to chamber 42.

With the valve 44 unseated, fluid under pressure in diaphragm chamber 23, and consequently fluid under pressure in chamber 15 connected to chamber 23 by way of the passage 21, chamber 20, choke 71 and passage 22, will flow to the piston chamber 42 by way of the passage 36, cavity 72, chamber 43 and passage 41. In response to the fluid pressure acting on the piston member 59, the piston member will move upwardly against the opposing pressure of the spring 54. This movement of the piston member will cause the valve 16 to again engage the valve seat 17, thus preventing further loss of fluid under pressure from the main reservoir 1 by way of pipe 5.

The reduction in the pressure of fluid in the main reservoir 1 will cause the compressor on the leading locomotive unit to start operating in the usual manner. This action in combination with the closing of the valve 16 might, if the choke 71 were not employed cause a rapid increase in the fluid pressure in the diaphragm chamber 23 causing the valve 46 to unseat and the valve 44 to seat before the fault causing the loss of fluid under pressure had been corrected. There would then follow another reduction in fluid pressure and a consequent rapid pumping action. This rapid pumping action is obviated by the effect of the choke 71 in the passage 22 which delays the pressure build-up in the chamber 23 and thereby lengthens the time interval between the closing and opening of the valve 16.

Assuming now that the compressor means on the leading locomotive unit has been rendered inoperative and that the compressor means on a trailing unit is operating to supply fluid under pressure to the main reservoir 11, the various parts of the protection valve device 4 will be in the position in which they are shown in the drawing. Fluid under pressure in the main reservoir 11 will flow therefrom to the main reservoir 1 by way of the main reservoir pipe 5, passage 19, bushing 18, chamber 15, passage 70 and pipe 3 until the exemplary 22 pounds are reached, at which time the valve 16 will be operated to its seated position in the same manner as hereinbefore described for 22 pounds of main reservoir pressure during the initial charging of the locomotive.

However, although the flow of fluid under pressure above 22 pounds from the main reservoir 11 to the main reservoir 1 is interrupted at valve 16, this flow will continue from passage 19, and reservoir 11, by way of strainer 30 in chamber 29, passage 28, past check valve 25, chamber 20, passage 21, chamber 15, passage 70 and pipe 3. When a fluid pressure of 100 pounds is attained in the main reservoir 1 and chamber 23 of the protection valve device 4, the same operation for unseating the valve 16 will take place as previously described in connection with the initial charging of the locomotive.

Having now described my invention what I claim as new and desire to secure by Letters Patent is:

1. The combination with a fluid conducting conduit normally charged with fluid under pressure, of a valve device comprising a casing having two communicating passages constituting a portion of said conduit, a valve operative to open and close the communication between said passages, movable abtument means normally retaining said valve in its open position and operative in response to fluid pressure to close said valve, and valve means for controlling the supply of fluid under pressure to and release of fluid under pressure from said movable abutment means, said valve means normally connecting said movable abutment means to atmosphere and being responsive to a certain degree of reduction in fluid pressure in one of said passages from the chosen normal pressure to close the connection of said movable abutment means to atmosphere and to connect said movable abutment means to said one passage.

2. In a fluid pressure flow control valve device having two connected passages adapted to establish communication between two fluid conducting conduits, a valve operative to one position to close the connection between said passages and operative to another position for opening the connection between said passages, piston means operative by fluid under pressure from one of said passages for actuating said valve to close the connection between said passages and operative upon a reduction in the pressure of such fluid for actuating said valve to open the connection between said passages, valve means responsive to variations in the pressure of fluid in said one passage for controlling the pressure of fluid acting on the first mentioned means, said valve means having a normal position in which said piston means is connected to atmosphere and being operative to another position in which the atmospheric connection is closed and said piston means is connected to said one passage, and a movable member responsive to variations in the pressure of fluid in said one passage to operate said valve means.

3. In a fluid pressure flow control valve device having two connected passages adapted to establish communication between two fluid conducting conduits, a valve operative to one position to close the connection between said passages and operative to another position for opening the connection between said passages, piston means operative by fluid under pressure from one of said passages for actuating said valve to close the connection between said passages and operative upon a reduction in the pressure of such fluid for actuating said valve to open the connection between said passages, valve means responsive to variations in the pressure of fluid in said one passage for controlling the pressure of fluid acting on the first mentioned means, said valve means having a normal position in which said piston means is connected to atmosphere and being operative to another position in which the atmospheric connection is closed and said piston means is connected to said one passage, and a movable member responsive to a reduction in the pressure of fluid in said one passage to actuate said valve means out of said normal position to said other position.

4. The combination with a fluid conducting conduit, of a fluid pressure flow control valve device comprising a casing having two fluid flow connecting passages constituting a portion of said conduit, a valve operable to open and close the fluid flow connection between said passages, movable abutment means responsive to fluid pressure for operating said valve to close said connection and responsive to a reduction in fluid pressure for operating said valve to open said connection, and valve means operative to supply fluid under pressure from said one of said passages to the movable abutment means to effect the operation to close said valve and operative in response to a certain degree of fluid pressure acting thereon to interrupt said supply and to connect said movable abutment means to atmosphere, thereby effecting the operation of said valve to open said fluid flow connection, said valve means being conditioned as an incident to the opening of said valve to respond to a degree of fluid pressure acting thereon lower than said certain degree to close the atmospheric connection to said movable abutment means and to again supply fluid under pressure from said one passage to said movable abutment means.

5. In combination, two fluid conducting passages, a valve controlling communication between said passages, piston means operable by fluid under pressure for closing said valve, valve means controlled by the pressure of fluid in one of said passages and operable when such pressure exceeds a chosen degree to release operating fluid under pressure from said piston means and when of a chosen lower value to supply operating fluid under pressure to said piston means, and means for opening said valve upon release of operating fluid under pressure from said piston means.

ERIK G. ERSON.

REFERENCES CITED

The following references are of record in the file of this patent:

UNITED STATES PATENTS

| Number | Name | Date |
|---|---|---|
| 1,469,585 | McCune | Oct. 2, 1923 |
| 2,407,890 | McClure | Sept. 17, 1946 |